United States Patent
Prem et al.

(10) Patent No.: US 11,106,815 B2
(45) Date of Patent: *Aug. 31, 2021

(54) SYSTEM, METHOD AND COMPUTER PRODUCT FOR FAST AND SECURE DATA SEARCHING

(71) Applicant: ID Insight, Minneapolis, MN (US)

(72) Inventors: Sudheer Prem, Roseville, MN (US); Matt Schraan, Minneapolis, MN (US)

(73) Assignee: ID Insight, Minneapolis ( * ) Notice: Subject to any disclaimer, the term of this patent is extended or adjusted under 35 U.S.C. 154(b) by 0 days.

This patent is subject to a terminal disclaimer.

(21) Appl. No.: 15/269,445

(22) Filed: Sep. 19, 2016

(65) Prior Publication Data

US 2017/0004325 A1 Jan. 5, 2017

Related U.S. Application Data

(63) Continuation of application No. 13/949,686, filed on Jul. 24, 2013, now Pat. No. 9,449,178.
(Continued)

(51) Int. Cl.
*G06F 12/14* (2006.01)
*G06F 7/04* (2006.01)
(Continued)

(52) U.S. Cl.
CPC .......... *G06F 21/6227* (2013.01); *G06F 16/81* (2019.01); *G06F 16/9535* (2019.01);
(Continued)

(58) Field of Classification Search
CPC ............. G06F 21/602; G06F 17/30911; G06F 17/30867; G06F 21/6227; H04L 9/14;
(Continued)

(56) References Cited

U.S. PATENT DOCUMENTS 6,088,450 A * 7/2000 Davis ...................... G06F 21/35
713/182
6,954,532 B1 * 10/2005 Handley ............ H04N 1/32144
380/216

(Continued)

OTHER PUBLICATIONS

Koutsonikola, Vassiliki, and Athena Vakali. "LDAP: framework, practices, and trends." IEEE Internet Computing 8.5 (2004): 66-72.*
(Continued)

*Primary Examiner* — Michael Simitoski
(74) *Attorney, Agent, or Firm* — Padda Law Group

(57) ABSTRACT

A system for fast secured searching may include a user interface, a web layer configured for executing application logic and configured for interacting with a user via the user interface and configured to perform user authentication, and a database layer in communication with and accessible by the web layer and comprising a database configured for storing data, and a search engine configured for searching the database, wherein, communication to and from the database layer from and to the web layer is controlled by secure socket layer certificate authorization. The database layer may also include an inverted index in communication with the database and the search engine and configured for maintaining updated snapshots relating to the data in the database and an encryption/decryption layer for selective encryption of the data and configurable for field level, document level, and/or chunk level encryption.

18 Claims, 9 Drawing Sheets

Related U.S. Application Data

(60) Provisional application No. 61/674,934, filed on Jul. 24, 2012.

(51) Int. Cl.

| | | |
|---|---|---|
| *H04L 9/32* | (2006.01) | |
| *G06F 21/62* | (2013.01) | |
| *G06F 21/60* | (2013.01) | |
| *G06F 16/81* | (2019.01) | |
| *G06F 16/9535* | (2019.01) | |
| *H04L 29/06* | (2006.01) | |
| *H04L 9/14* | (2006.01) | |
| *H04L 9/28* | (2006.01) | |

(52) U.S. Cl.
CPC .............. *G06F 21/602* (2013.01); *H04L 9/14* (2013.01); *H04L 9/3263* (2013.01); *H04L 63/0823* (2013.01); *H04L 63/164* (2013.01); *H04L 2209/30* (2013.01)

(58) Field of Classification Search
CPC ............. H04L 2209/30; H04L 63/0823; H04L 63/164; H04L 9/3263
See application file for complete search history.

(56) References Cited

U.S. PATENT DOCUMENTS

| | | | | |
|---|---|---|---|---|
| 6,978,366 | B1* | 12/2005 | Ignatchenko | G06F 21/6218 713/165 |
| 7,484,092 | B2* | 1/2009 | Rajasekaran | G06F 17/30067 707/999.003 |
| 7,558,970 | B2* | 7/2009 | Bellovin | H04L 9/3218 713/193 |
| 7,874,013 | B2* | 1/2011 | Kaminaga | G06F 21/62 726/28 |
| 8,117,464 | B1* | 2/2012 | Kogelnik | H04L 63/0428 713/193 |
| 8,442,994 | B1* | 5/2013 | Chen | G06F 17/30864 707/711 |
| 8,756,696 | B1 | 6/2014 | Miller | |
| 8,782,632 | B1* | 7/2014 | Chigurapati | G06F 8/65 717/168 |
| 8,909,943 | B1* | 12/2014 | Shankar | G06F 21/6209 380/281 |
| 9,460,026 | B1* | 10/2016 | Kilday | G06F 12/14 |
| 9,971,904 | B2* | 5/2018 | Fan | G06F 21/6218 |
| 2003/0035547 | A1* | 2/2003 | Newton | H04L 63/0485 380/279 |
| 2003/0145205 | A1* | 7/2003 | Sarcanin | G06Q 20/02 713/172 |
| 2004/0078568 | A1* | 4/2004 | Pham | G06F 21/6218 713/165 |
| 2004/0125402 | A1* | 7/2004 | Kanai | G06F 21/608 358/1.15 |
| 2004/0181679 | A1* | 9/2004 | Dettinger | G06F 21/6245 713/193 |
| 2004/0255133 | A1* | 12/2004 | Lei | G06F 21/6227 713/193 |
| 2005/0004924 | A1* | 1/2005 | Baldwin | G06F 16/2246 |
| 2005/0154886 | A1* | 7/2005 | Birk | H04L 63/0815 713/168 |
| 2006/0026159 | A1* | 2/2006 | Dertinger | G06F 21/6227 |
| 2006/0080316 | A1* | 4/2006 | Gilmore | G06F 17/30864 |
| 2007/0174271 | A1* | 7/2007 | Mattsson | G06F 21/604 |
| 2007/0255698 | A1* | 11/2007 | Kaminaga | G06F 21/62 |
| 2007/0276835 | A1* | 11/2007 | Murthy | G06F 21/6227 |
| 2008/0033637 | A1* | 2/2008 | Kuhlman | H04L 63/10 701/533 |
| 2008/0133935 | A1* | 6/2008 | Elovici | H04L 9/14 713/193 |
| 2008/0162551 | A1 | 7/2008 | Geyer et al. | |
| 2008/0201384 | A1* | 8/2008 | Batterywala | G06F 16/14 |
| 2009/0063470 | A1* | 3/2009 | Peled | G06F 40/295 |
| 2009/0300351 | A1* | 12/2009 | Lei | G06F 17/30864 713/165 |
| 2009/0319477 | A1* | 12/2009 | Idicula | G06F 16/24534 |
| 2009/0319772 | A1* | 12/2009 | Singh | G06F 21/6218 713/153 |
| 2010/0121856 | A1* | 5/2010 | Lei | G06F 17/30091 707/747 |
| 2010/0146582 | A1* | 6/2010 | Jaber | G06F 21/6218 726/1 |
| 2010/0169321 | A1* | 7/2010 | Wang | G06F 16/316 707/741 |
| 2011/0004607 | A1* | 1/2011 | Lokam | G06F 21/6227 707/759 |
| 2011/0302211 | A1* | 12/2011 | Kilday | G06F 21/6218 707/785 |
| 2011/0313981 | A1* | 12/2011 | Ben-Natan | G06F 16/2455 707/694 |
| 2012/0066203 | A1* | 3/2012 | Robert | G06F 17/30864 707/711 |
| 2012/0078914 | A1* | 3/2012 | Roeder | G06F 17/30619 707/741 |
| 2012/0131683 | A1 | 5/2012 | Nassar et al. | |
| 2012/0204032 | A1 | 8/2012 | Wilkins et al. | |
| 2012/0275452 | A1* | 11/2012 | Rojas | H04L 12/581 370/352 |
| 2013/0117298 | A1 | 5/2013 | Ray | |
| 2013/0138666 | A1* | 5/2013 | Muller | G06F 21/6227 707/754 |
| 2013/0262408 | A1* | 10/2013 | Simmen | G06F 17/30283 707/693 |
| 2013/0325824 | A1* | 12/2013 | Shoens | G06F 17/30115 707/698 |
| 2014/0373177 | A1* | 12/2014 | Arning | G06F 21/6218 726/28 |
| 2016/0125198 | A1* | 5/2016 | Hahn | G06F 21/6227 713/165 |

OTHER PUBLICATIONS

Mavridis, Ioannis, et al. "Access control based on attribute certificates for medical intranet applications." Journal of medical Internet research 3.1 (2001).*
Kailar, Rajashekar. "A security architecture for health information networks." AMIA Annual Symposium Proceedings. vol. 2007. American Medical Informatics Association, 2007.*
Garfinkel, Simson L. "Email-based identification and authentication: An alternative to PKI?." IEEE Security & Privacy 99.6 (2003): 20-26.*
Lu, Wenjun, et al. "Enabling search over encrypted multimedia databases." Media Forensics and Security. vol. 7254. International Society for Optics and Photonics, 2009. (Year: 2009).*
Ohtaki, Yasuhiro. "Constructing a searchable encrypted log using encrypted inverted indexes." Cyberworlds, 2005. International Conference on. IEEE, 2005. (Year: 2005).*
Wang, Cong, et al. "Secure ranked keyword search over encrypted cloud data." Distributed Computing Systems (ICDCS), 2010 IEEE 30th International Conference on. IEEE, 2010. (Year: 2010).*
Ananthi, S., M. Sadish Sendil, and S. Karthik. "Privacy preserving keyword search over encrypted cloud data." International Conference on Advances in Computing and Communications. Springer, Berlin, Heidelberg, 2011. (Year: 2011).*

* cited by examiner

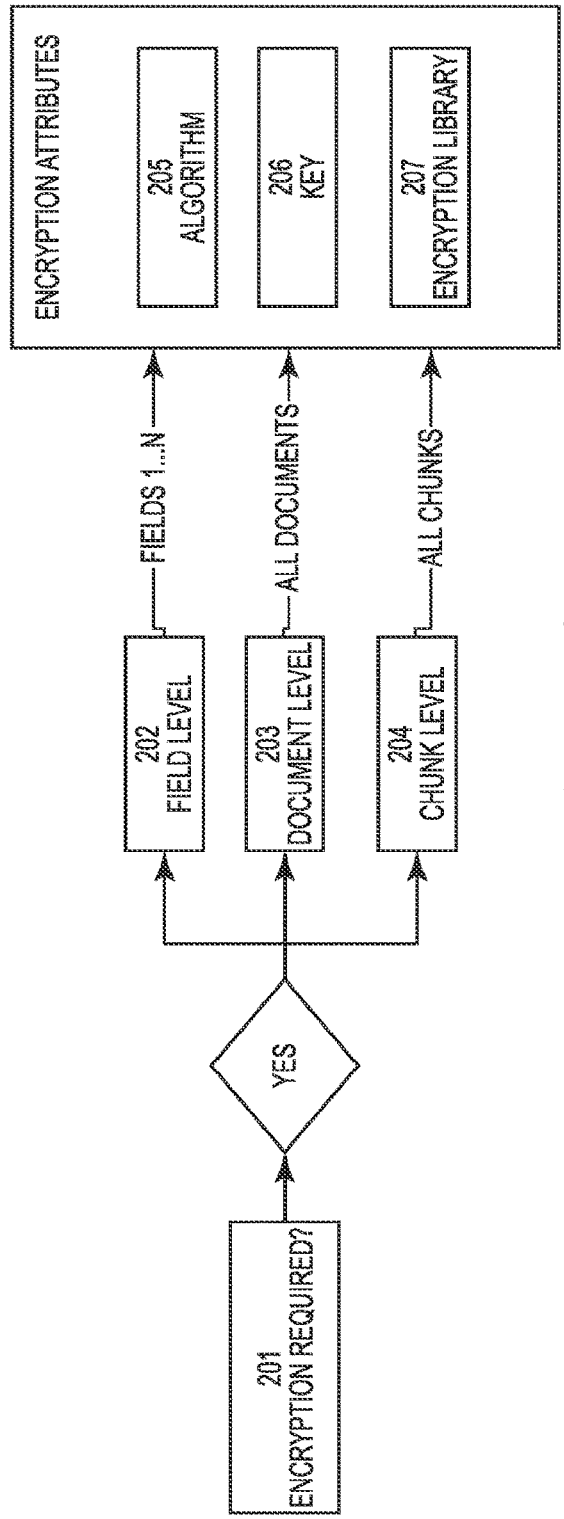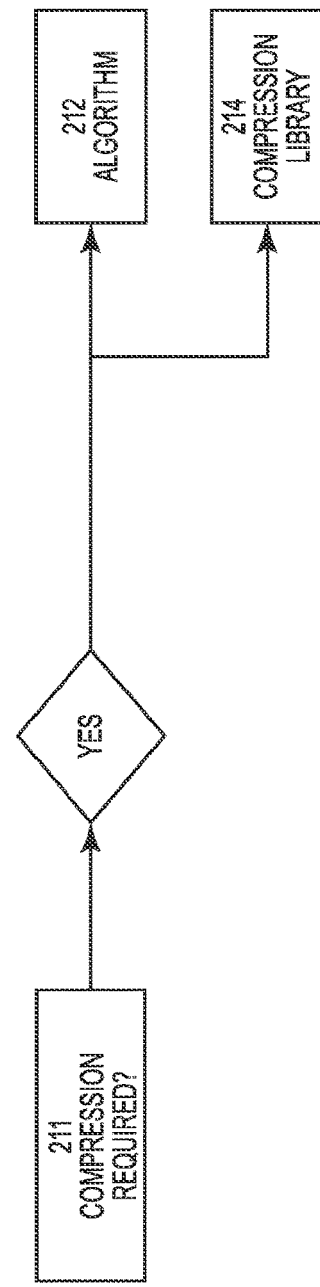

SYSTEM, METHOD AND COMPUTER PRODUCT FOR FAST AND SECURE DATA SEARCHING

CROSS-REFERENCE TO RELATED APPLICATIONS

The present application claims priority to U.S. Provisional Application No. 61/674,934 entitled System, Method and Computer Product for Fast and Secure Data Searching, filed on Jul. 24, 2012, the content of which is hereby incorporated by reference herein in its entirety.

FIELD OF THE INVENTION

The present application relates to electronic data storage and searching. More particularly, the present application relates to refinements in data storage and data security in addition to refinements in fast and efficient searching of the data. Still more particularly, the present application relates to particular approaches to user authorization and encryption as well as a framework allowing for adjustment of several components affecting encryption and compression of data.

BACKGROUND

A number of businesses and/or applications treat data that is collected, stored, searched and/or disseminated with increased or heightened security. For example, banks, credit card companies, health insurance companies, and many other businesses apply some level of security when information is transferred back and forth and/or stored, including when the data is stored and/or accessed in an on-line environment. Other industries may not deal as intensely with secure and/or protected information, but still may have some aspects of their business that deal with sensitive data that is handled in a secure manner. For example, on-line ordering, including payment, can include a customer providing a credit card number and/or account number that is to be handled in a secure manner. One method for providing security in an on-line environment includes encrypting data. For some applications, however, accessing and/or searching encrypted data can take longer than desired. There is a need, therefore, for systems, methods, and computer products that allow for fast to very fast searching of secured data.

SUMMARY OF THE INVENTION

In one or more embodiments, a system for fast secured searching may include a user interface, a web layer, and a database layer. The web layer may be configured for executing application logic and configured for interacting with a user via the user interface. The web layer may also be configured to perform user authentication. The database layer may be in communication with and accessible by the web layer. The database layer may include a database configured for storing data and a search engine configured for searching the database. In this system, communication to and from the database layer from and to the web layer may be controlled by secure socket layer certificate authorization.

In one or more embodiments, a system for fast secured searching may include a user interface, a web layer, and a database layer. The web layer may be configured for executing application logic and configured for interacting with a user via the user interface. The database layer may be in communication with and accessible by the web layer. The database layer may include a database configured for storing data, a search engine configured for searching the database, an inverted index in communication with the database and the search engine and configured for maintaining updated snapshots relating to the data in the database, and an encryption/decryption layer for selective encryption of the data and configurable for field level, document level, and/or chunk level encryption.

A system for fast secured searching may include a web layer including a user accessible web server, wherein the user logs-in to and is authenticated by the system in order to perform searches and receive results. The system may also include an application server communicably coupled to the web server, wherein the application server authenticates the user's log-in information. The system may also include a database layer communicably coupled to the web layer. The database layer may include a search server including computer-executable instructions to perform searches of data based on a user's search query and authorization level, an inverted index communicably coupled to the search server and containing encrypted data, and a database containing encrypted data communicably coupled to the index, wherein the index takes a snapshot of the data stored in the database. The system may require SSL certificate authorization to access the database layer from the web layer and the system may also require SSL certificate authorization to send data from the database layer to the web layer.

BRIEF DESCRIPTION OF THE DRAWINGS

FIG. 2A shows a configuration framework depicting various options for an encryption method used to secure and store searchable information in the system.

FIG. 2B shows a configuration framework depicting a compression method used to compress information stored in the system.

DETAILED DESCRIPTION

The present disclosure, in some embodiments, is directed to an enhanced on-line searching system allowing for searching of large volumes of secured data with great speed. The system may allow for encryption at several different levels including field encryption, document level encryption, and chunk level encryption depending on the type of data being stored and balanced against the speed with which the user wishes to access and/or search the data. For example, where a relatively low percentage of fields in an index are desired to be encrypted, field encryption may be used to optimize speed of search. In another example, where a relatively high percentage of all the fields in an index are desired to be encrypted, document level encryption may be used to optimize speed of search. In still another example, where various documents grouped together as a chunk are likely to take less time to encrypt (e.g., due to redundant words), the speed of search may be optimized with chunk level encryption. In addition to the several different levels of encryption, the system may include data encryption at both the reference level of the index as well as at the storage layer thereby adding yet another level of encryption. In addition to encryption, data compression may also be included, which may allow for an increase in search speed and an increase in security. Still further, the system may include several stages of authorization such that a particular set of users may be identified, the users' identities may be continually verified at particular stages, and search results may be filtered to control the type of information available to each user.

With this system, in some cases, searches of secured data may take as little as less than one second. This may reflect a vast improvement over current search technology, which can take up to several seconds, and even sometimes minutes, to search through large amounts of secured data. Still further, current search technology methods have difficulty in balancing search speed and responsiveness with security objectives such as encryption and data authorization. When data is secured at rest with these techniques, the search performance and speed is often hindered. The present disclosure describes a search system architecture to facilitate extremely fast searches without compromising the level of data security. The search system architecture may be implemented in any software application in which the users desire to securely search amongst structured or unstructured data.

Figure 1:
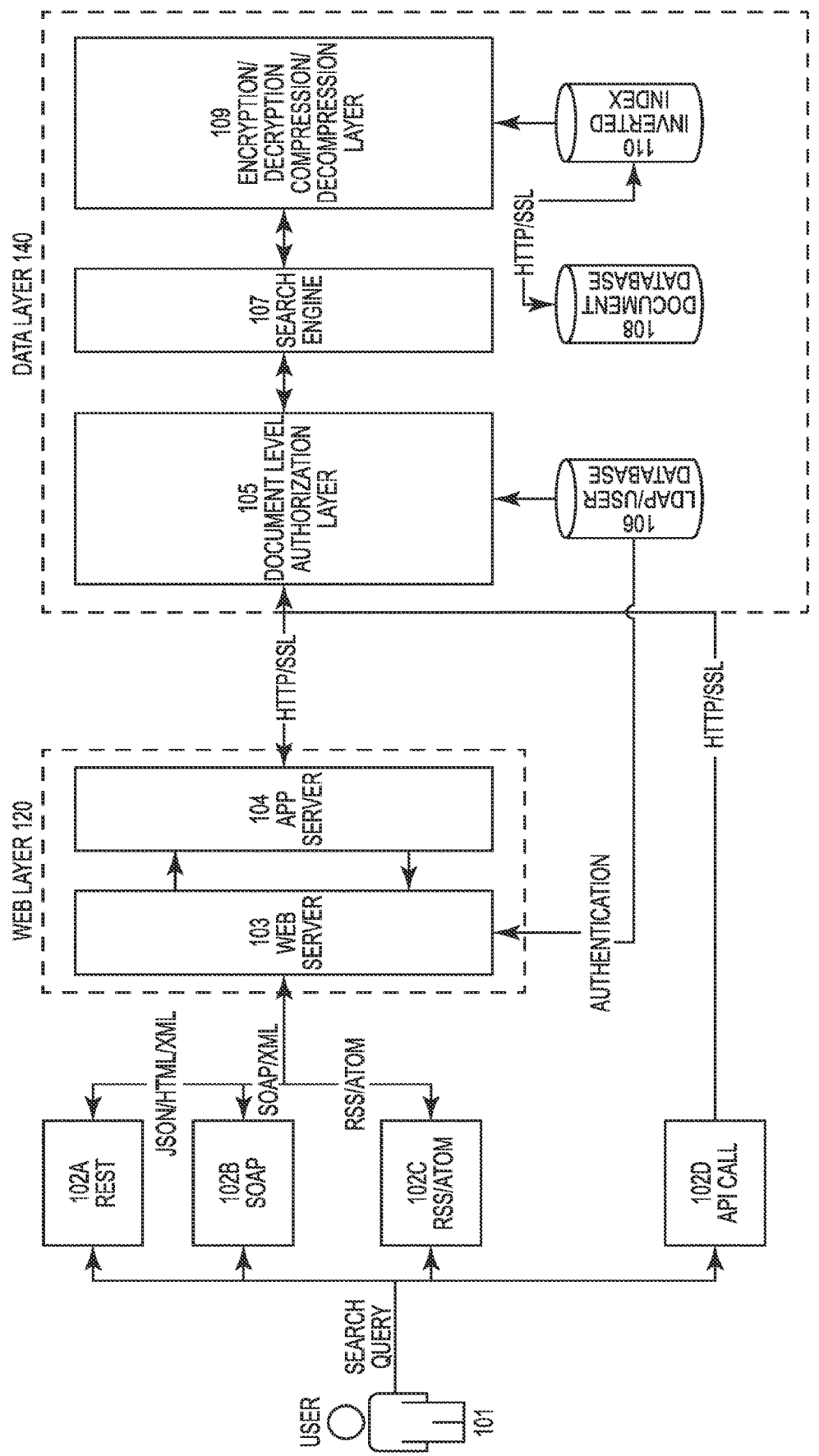
FIG. 1 shows an embodiment of a system diagram of the present disclosure.

Referring now to FIG. 1, one embodiment of a system 100 of the present disclosure is shown. As may be seen, a user 101 may be a human or another system, and may perform a search using the on-line system 100. In some cases the user 101 may be a bank employee, or a fraud investigator, for example, though in other embodiments, the user 101 may be any type of user wishing to perform a secure search. The user 101 may access the system through various interfaces 102 such as Representational State Transfer (REST) 102A, Simple Object Access Protocol (SOAP) 102B, Rich Site Summary/Atom (RSS/ATOM) 102C, or an Application Programming Interface (API) Call 102D.

Through one of the aforementioned interfaces, the user 101 may interact with a front-end secure web-based server 103. In order to perform searches using the system, the user may first be authenticated and logged in to system through the web server 103. The system may then determine who the user is, what applications the user may have access to, and what type of data the user may have access to, for example. In some embodiments, the authorization level of the user may dictate the look of the user interface. All of the information for identifying who the user is and what applications the user may have access to may be stored and referenced upon user login from an Lightweight Directory Access Protocol (LDAP) server and User Database 106.

The web server 103 may be communicatively coupled to the application server 104. The application server 104 may house the application logic and/or source code for any software application that may have a use for secured searching amongst structured data. In one particular embodiment, where efforts are made to identify fraud, the application server 104 may house the application logic, and/or source code that calculates a score. Generally, scores may be used to predict the likelihood of an identity fraud event in progress, for example. Scores may be derived from, for example, but not limited to identity verification attributes, demographic differential attributes, descriptors of the address/phone/social security number in question, behavioral attributes, and any other suitable source. Depending on the intended use (for example, new financial account applications, address changes, for example), different attributes may be weighted different. In other embodiments, however, a score may not be a part of the system or method. Still other application logic and/or source code having a use for secured searching and data storage may be housed by the application server. It is to be appreciated that while a web-server 103 and application server 104 may have been identified, the discussion is for purposes of explanation and nothing shall be construed as requiring that the system include two physical servers. The same may be true for other aspects of the system and the hardware configuration for the above-described system may vary and suitable hardware arrangements may be selected by a designer and/or user depending on the needs of the entity utilizing the system.

The data layer 140 may include a document level authorization layer 105, a search engine 107, and an encryption/decryption and compression/decompression layer 109. The document level authorization layer 105 may be configured for controlling which users are able to access which data records through search. The search engine server 107 may hold the search query logic and may route each search query to the inverted index 110. The encryption/decryption and compression/decompression layer 109 may be configured encrypting and/or compressing data for storage on the document database 108. The data layer 140 may also include an LDAP user database 106, a document database 108, and an inverted index 110. The LDAP user database 106 may be configured for housing the list of all active system users and their associated application roles and permissions. The document database 108 may contain the master record of all the searchable data. The inverted index 110 may contain a regularly updated impression of all of the searchable data records contained in the document database 108. That is, the inverted index 110 may include a reference layer that pairs any possible search term (token), with a listing of all of the documents (posting list) containing that search term. Accordingly, search queries may be made against the inverted index 110 and, because the index contains information stored in the database in a highly compact manner (inverted index), searching the index, even though it is encrypted, may be fast, and in some cases, relatively exceptionally fast as compared to searching non-indexed but encrypted data.

In addition to the described user interfaces 102, the web layer 120 and the data layer 140, further reference to FIG. 1 shows additional security provided to the system by the inclusion of two way secure socket layer (SSL) certificate authentication between various system nodes used for various system functions. For example, communication may be secured with two way SSL certificate authentication when going from the web layer 120 to the data layer 140 and again when data is moving from the data layer 140 to the web layer 120. In some embodiments, this may separately or additionally include two way SSL certification authentication between the database 108 and the inverted index 110. This method increases the security of the system in a number of ways. For example, if the system was hacked into, the data could not be accessed in the index or the database without a valid certificate. Further, even if the server was physically stolen, a certificate would still be needed to access the data. This, of course, is in addition to the security provided by the data being encrypted at rest.

The data stored in the index 110, in some embodiments, may be encrypted to achieve a higher level of security, and/or compressed to achieve a higher level of speed and responsiveness. Configurable properties of the inverted index 110 may include the method of encryption used to secure the data records, as well as the method of compression used to reduce the size of the data records in storage.

FIG. 2 captures and illustrates these configurable properties in FIG. 2. For applications which require data to be encrypted 201 in storage, the data may be encrypted at the field level 202, the document level 203, or the chunk level 204. Within each of these possible configurations dictating the level of encryption, the actual algorithm 205 used to encrypt the data and the associated encryption/decryption key 206 may also be configured differently for each application. Further, different individual fields, documents, or chunks in the inverted index 110 may be encrypted with different algorithms 205 or encryption/decryption keys 206. Examples of encryption algorithms 205 that may be used include Advanced Encryption Standard (AES), Triple Data Encryption Standard (3DES), or other custom algorithms. In instances where multiple encryption algorithms 205 and keys 206 are used, a library 207 containing all of the possible encryption algorithms and keys may be utilized.

With field level encryption 202, individual fields within the inverted index 110 that are deemed sensitive or needing heightened security may be encrypted while the rest of the index remains in clear text. The speed of search may be optimized with field level encryption 202 in instances where a relatively low percentage of all the fields in the inverted index 110 are desired to be encrypted.

With document level encryption 203, all of the individual fields collectively making up one document within the inverted index 110 may be encrypted together. The speed of search may be optimized with document level encryption 203 in instances where a relatively high percentage of all the fields in the inverted index 110 are required to be encrypted.

With chunk level encryption 204, multiple documents within the inverted index 110 are stored and encrypted together as one fixed size object herein referred to as a "chunk". The speed of search may be optimized with chunk level encryption in scenarios where the various documents grouped together as a chunk are likely to take less time to encrypt. This may include documents that contain redundant words or phrases.

FIG. 2 also contains a depiction of compression 211, which may be another configurable property of the inverted index 110. Compression may be utilized to reduce the size of the data in its encrypted state, and therefore increase the speed of search. In addition to increasing the speed of search, another benefit gained from compression may include increased security. That is, because compression combined with encryption reduces the occurrence of redundant words or phrases found in the data, it makes hacking techniques such as cryptographic frequency analysis much more difficult to accomplish. Compression may be utilized at the field level, the document level, or the chunk level. The system may support various compression algorithms 213 and an associated compression library 214. Examples of compression algorithms 213 that may be used include a lossless data compression algorithm such as LZ4, or a lossless data compression algorithm combined with Huffman coding such as DEFLATE, or other custom algorithms.

In some embodiments, the index 110 may be updated at periodic intervals with information stored in the database 108. For each of the several encryption levels mentioned, FIGS. 3A-3C each show the process of these updates.

Figure 3A:
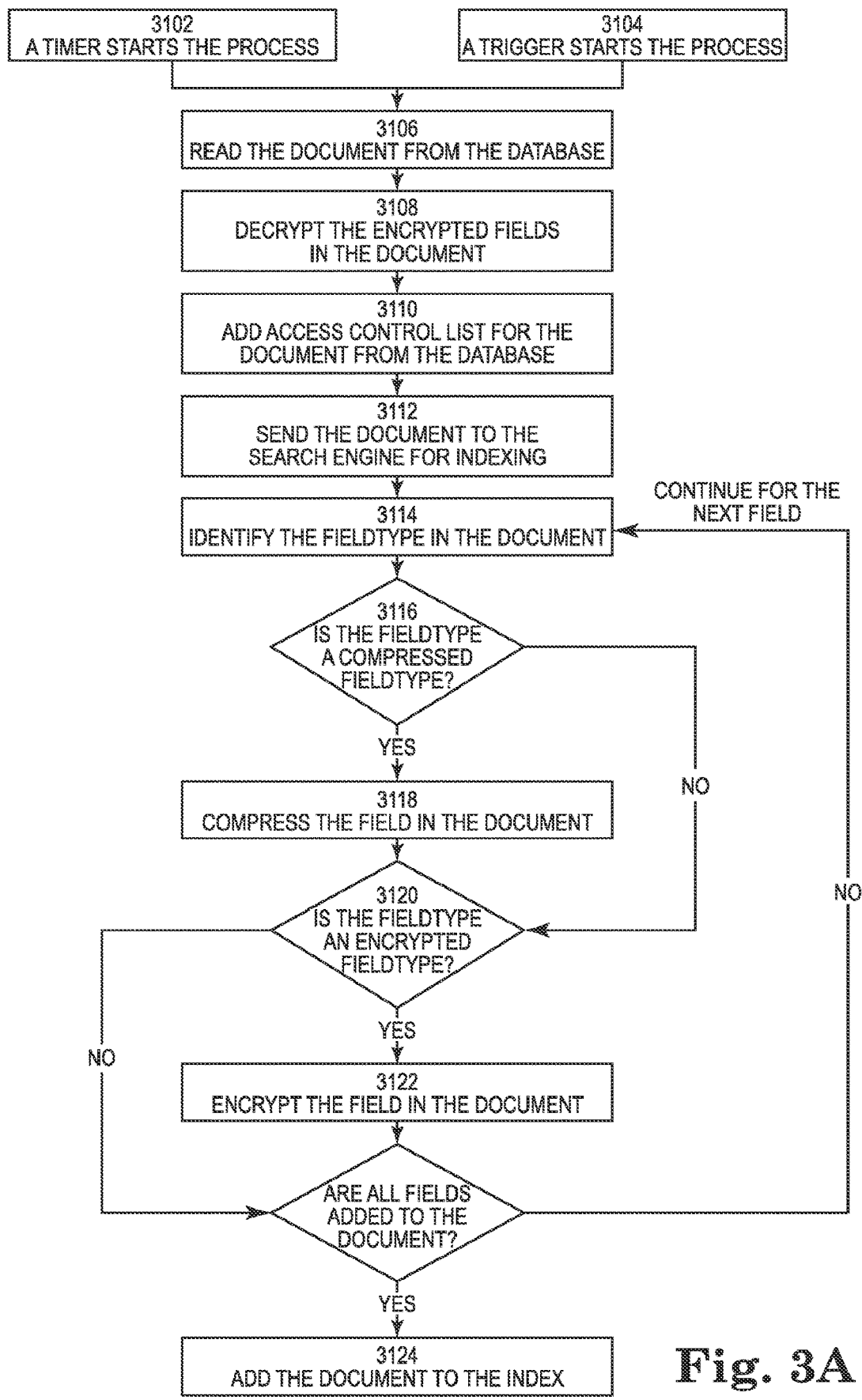
FIG. 3A shows a process for loading searchable information into the system in instances where a field level method of data encryption is utilized.

For example, FIG. 3A depicts a process 3100 for updating and loading data into the inverted index 110, specifically when field level encryption 202 is used. When completed, this process may enable the data to be searchable by a user of the system. The process may begin with a timer 3102 to schedule at what interval the update process 3100 will be performed. The timer 3102 may be configured for any suitable interval, including continuously updating, or any longer interval, for example every 20 seconds, 30 seconds, or minute. In some embodiments, a trigger 3104 such as an edit or change made by a user to an existing document may prompt the update process 3100.

After the update process 3100 is initiated as a result of either a timed update 3102 or a triggered update 3104, the new documents to be added or updated in the index are read from the database 3106. As the documents may sit in an encrypted state in the database, a decryption routine 3108 may be followed to temporarily decrypt the data while the rest of the steps are completed. In some embodiments, an additional level of control is provided in that each document stored in the index may be associated with an access control list 3110 that determines and enforces which users are authorized and able to view a particular document. After the access control list is added 3110 to each document, the documents may be sent to the search engine for indexing 3112.

In some embodiments, all or some of the fields within each document may be compressed to reduce storage size and increase searching speed before they are ultimately written to the index. If the document contains fields to be compressed 3116, the compression process 3118 may take place for those fields configured for compression. In some embodiments, all or some of the fields within each document may be encrypted 3120 at the field level to increase security of the information. If the document contains field level encryption 3120, the encryption algorithm may then be run 3122 to encrypt those fields so that are transformed into unreadable cipher text. Where additional fields are to be compressed and/or encrypted, several of the above operations (i.e., 3114, 3116, 3118, 3120, and/or 3122) may be repeated. In some embodiments, after compression and/or encryption is achieved for the desired fields, the documents may be written to the index 3124. When the process 3100 is complete, the document may then be stored and made generally instantly searchable, with all of the same security and encryption controls as are applied to documents already existing in the index.

Figure 3B:
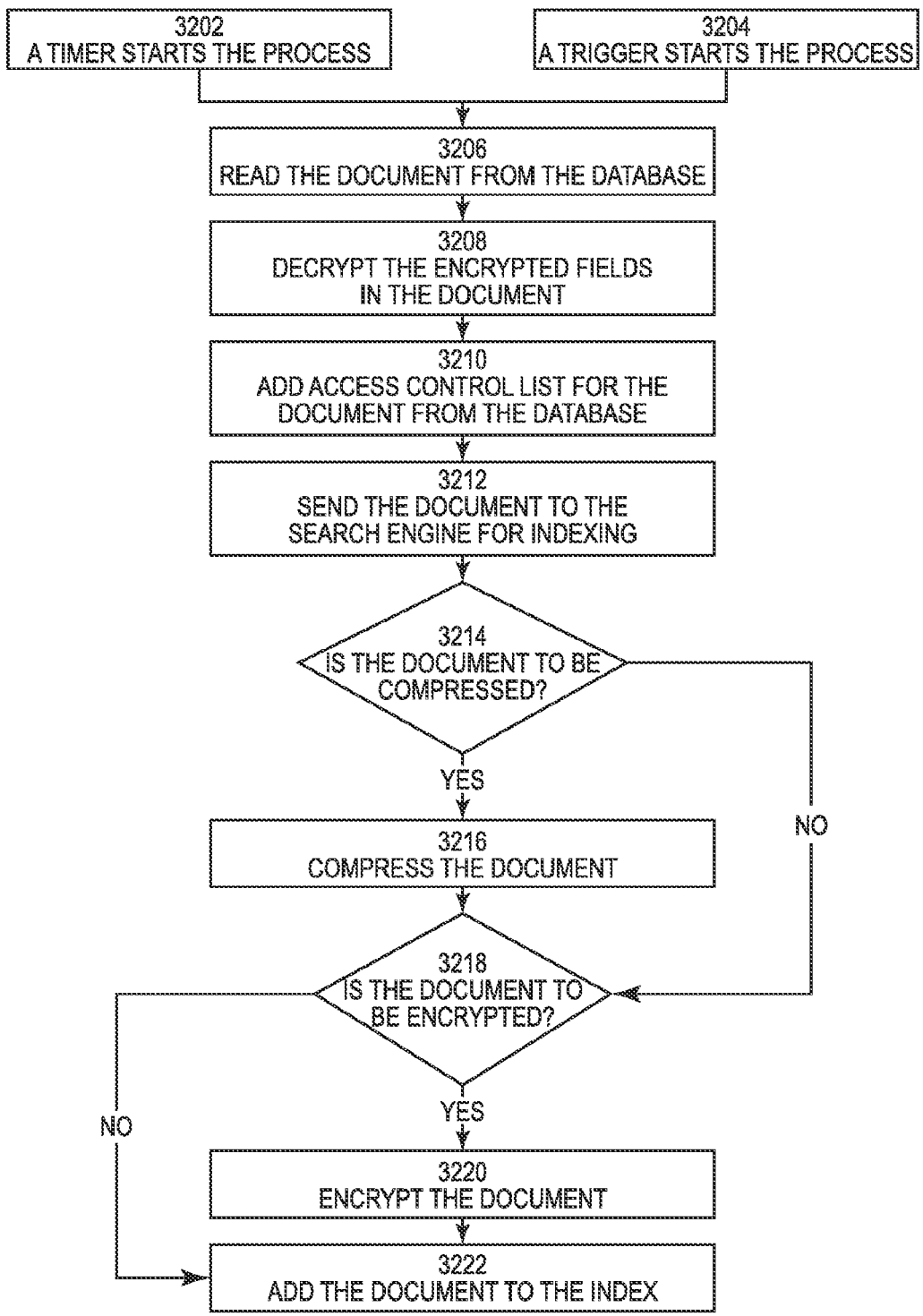
FIG. 3B shows a process for loading searchable information into the system in instances where a document level method of data encryption is utilized.

FIG. 3B depicts the process 3200 for updating and loading data into the inverted index 110, specifically when document level encryption 203 is used. When completed, this process may enable the data to be searchable by a user of the system. The process may begin with a timer 3202 to schedule at what interval the update process 3200 will be performed. The timer 3202 may be configured for any suitable interval, including continuously updating, or any longer interval, for example every 20 seconds, 30 seconds, or minute. In some embodiments, a trigger 3204 such as an edit or change made by a user to an existing document may prompt the update process 3200.

After the update process 3200 is initiated as a result of either a timed update 3202 or a triggered update 3204, the new documents to be added or updated in the index are read from the database 3206. As the documents may sit in an encrypted state in the database, a decryption routine 3208 may be followed to temporarily decrypt the data while the rest of the steps are completed.

In some embodiments, an additional level of control is provided in that each document stored in the index may be associated with an access control list 3210 that determines and enforces which users are authorized and able to view a particular document. After the access control list is added 3210 to each document, the documents may be sent to the search engine for indexing 3212.

The entirety of each document may be compressed to reduce storage size and increase searching speed before being written to the index in some embodiments. If the document is to be compressed 3214, the compression process 3216 may take place for each document. In some embodiments, the entirety of each document may be encrypted 3218 to increase security of the information. If the document contains document level encryption 3218, the encryption algorithm may then be run 3220 to encrypt those documents so they are transformed into unreadable cipher text. In some embodiments, after compression and/or encryption is achieved for the documents, the documents may be written to the index 3222. When the process 3200 is complete, the document may then be stored and made generally instantly searchable, with all of the same security and encryption controls as are applied to documents already existing in the index.

Figure 3C:
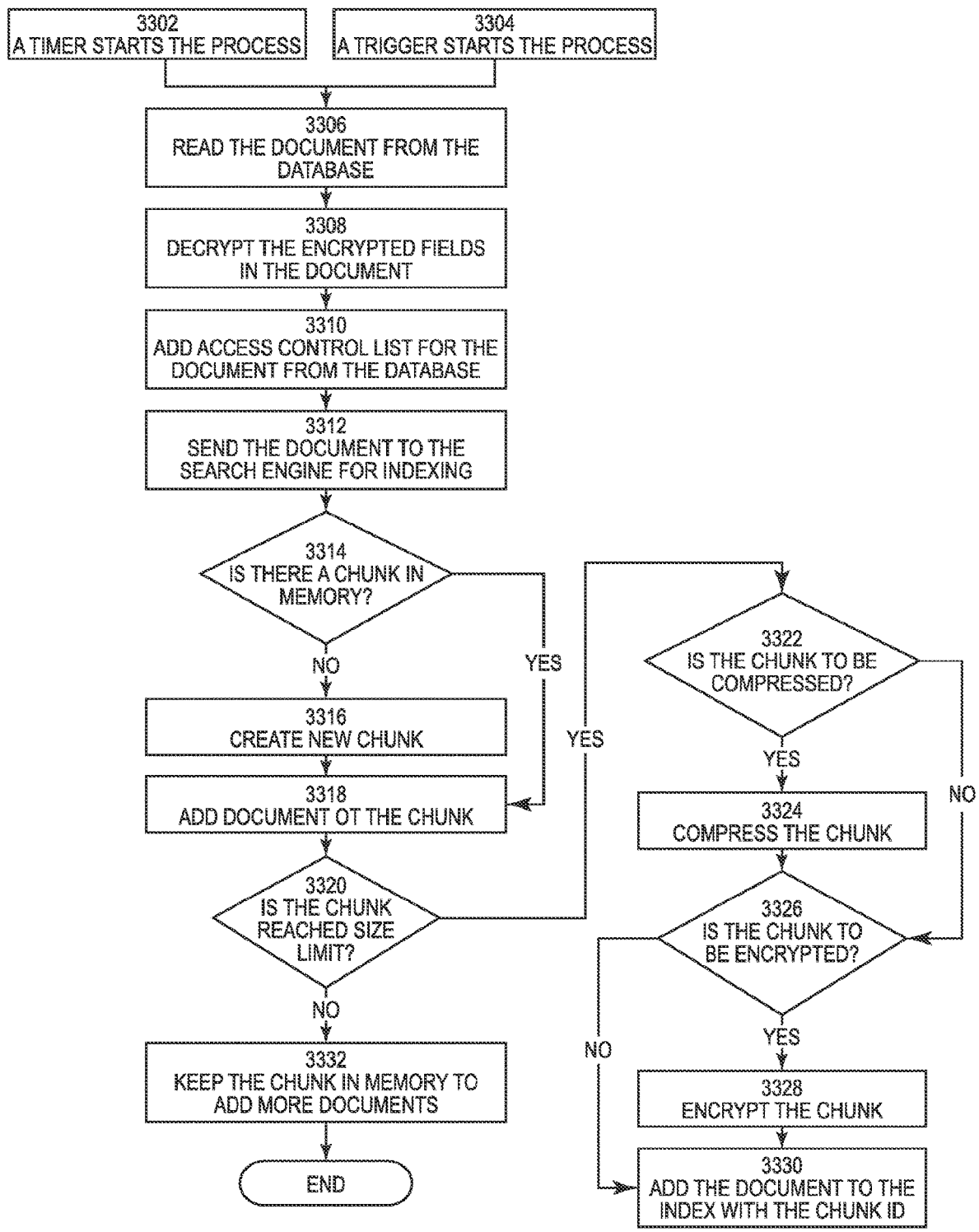
FIG. 3C shows a process for loading searchable information into the system in instances where a chunk level method of data encryption is utilized.

FIG. 3C depicts the process 3300 for updating and loading data into the inverted index 110, specifically when chunk level encryption 204 is used. When completed, this process may enable the data to be searchable by a user of the system. The process may begin with a timer 3302 to schedule at what interval the update process 3300 will be performed. The timer 3302 may be configured for any suitable interval, including continuously updating, or any longer interval, for example every 20 seconds, 30 seconds, or minute. In some embodiments, a trigger 3304 such as an edit or change made by a user to an existing document may prompt the update process 3300.

After the update process 3300 is initiated as a result of either a timed update 3302 or a triggered update 3304, the new documents to be added or updated in the index are read from the database 3306. As the documents may sit in an encrypted state in the database, a decryption routine 3308 may be followed to temporarily decrypt the data while the rest of the steps are completed.

In some embodiments, an additional level of control is provided in that each document stored in the index may be associated with an access control list 3310 that determines and enforces which users are authorized and able to view a particular document. After the access control list is added 3310 to each document, the documents may be sent to the search engine for indexing 3312.

In some embodiments, documents may be grouped together as chunks, and each chunk may be compressed to reduce storage size and increase searching speed before being written to the index. A chunk may be defined as multiple documents grouped together until a pre-determined size is reached for the purposes of storage. In some embodiments, the pre-determined size of each chunk may be measured in bytes. In some embodiments of process 3100, if the documents are to be grouped together and compressed as chunks, the system may first determine 3314 if there is an existing chunk that is left with remaining unused capacity in the system memory. If there is an existing chunk with unused capacity, the document will be added to that chunk 3318. If the application determines there is not an existing chunk with unused capacity, a new chunk may be created 3316. After the document is either added to a new chunk 3316 or an existing chunk with unused capacity 3318, the system may then determine if that chunk to which the document was just added has reached its maximum capacity 3320.

In some embodiments, once the system determines that the chunk has reached its maximum capacity 3320, it may move on to compression and encryption. If it is determined that the chunk is to be compressed 3322, a compression process 3324 may take place for each chunk. In some embodiments, each chunk of documents may be encrypted 3326 to increase security of the information. If the document contains chunk level encryption 3326, the encryption algorithm may then be run 3328 to encrypt those documents so they are transformed into unreadable cipher text. In some embodiments, after compression and/or encryption is achieved for the chunks, the documents may be written to the index 3330. Along with each chunk of documents, the system may also write a unique identifier for each chunk to the index. This identifier may then be referenced when a user performs a search against one or more of the documents held within the chunk. When the process 3300 is complete, the chunk of documents may then be stored and made generally instantly searchable, with all of the same security and encryption controls as are applied to documents already existing in the index.

Figure 4A:
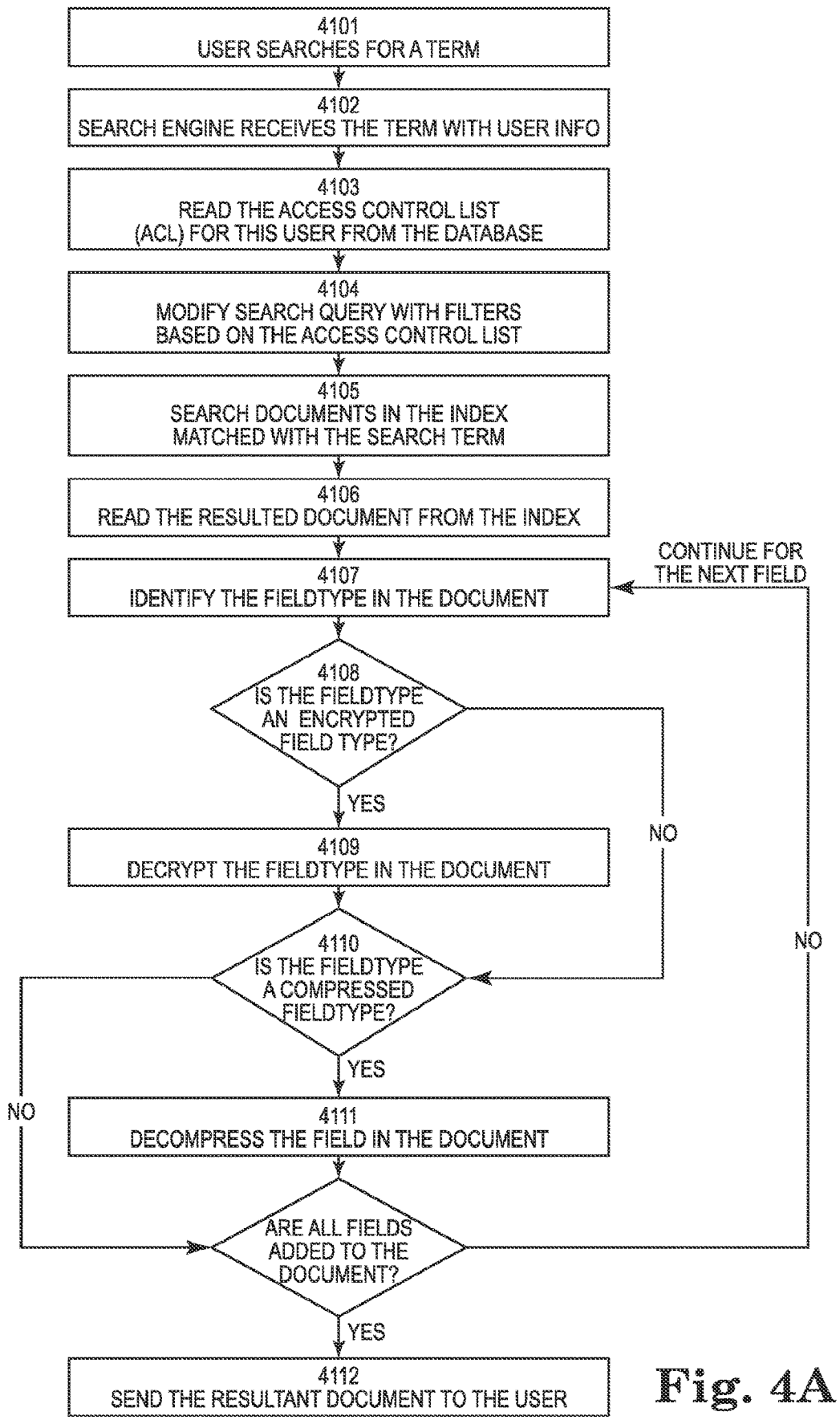
FIG. 4A shows a process for searching for information housed in the system in instances where a field level method of data encryption is utilized.
Figure 4B:
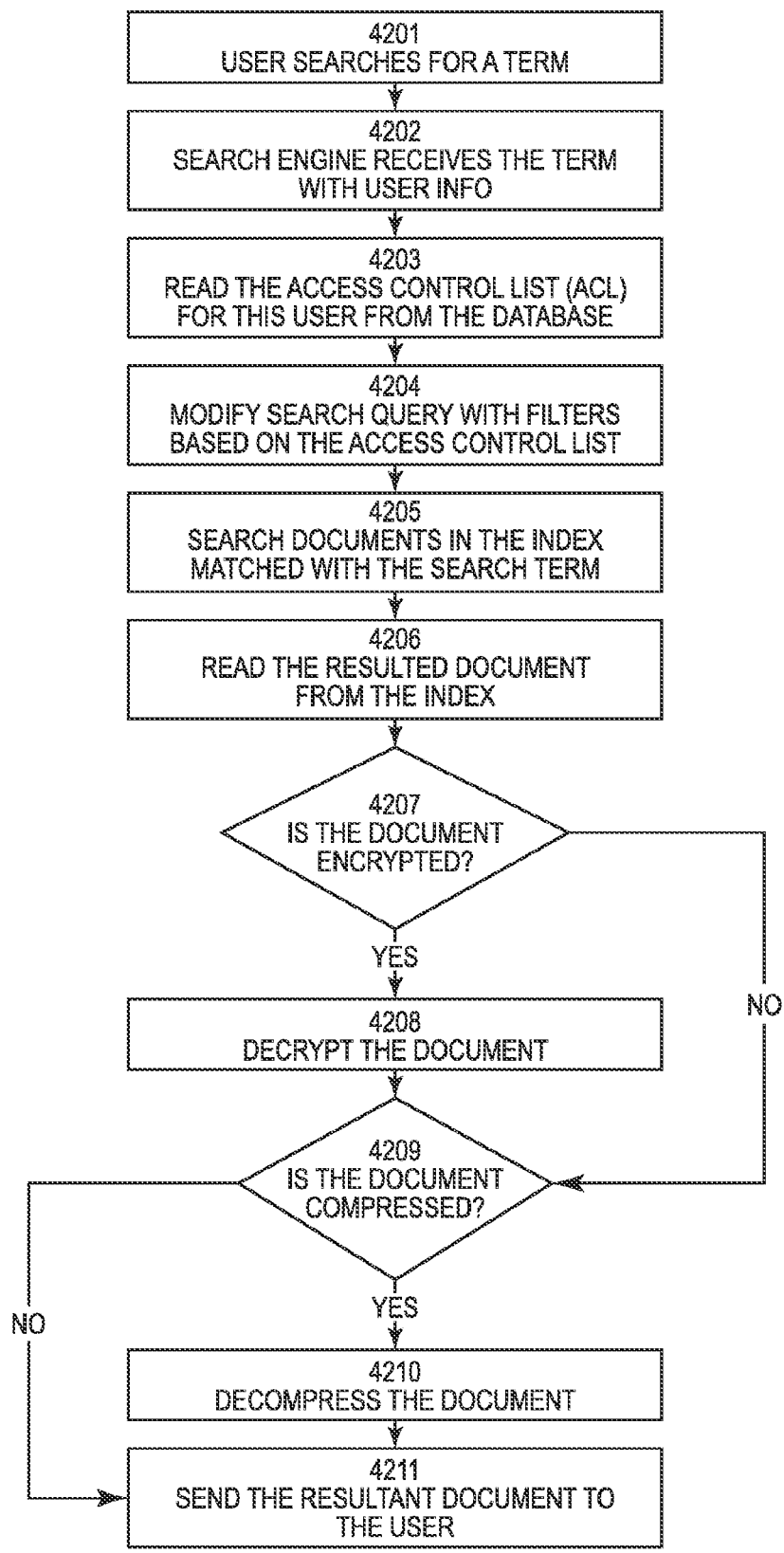
FIG. 4B shows a process for searching for information housed in the system in instances where a document level method of data encryption is utilized.
Figure 4C:
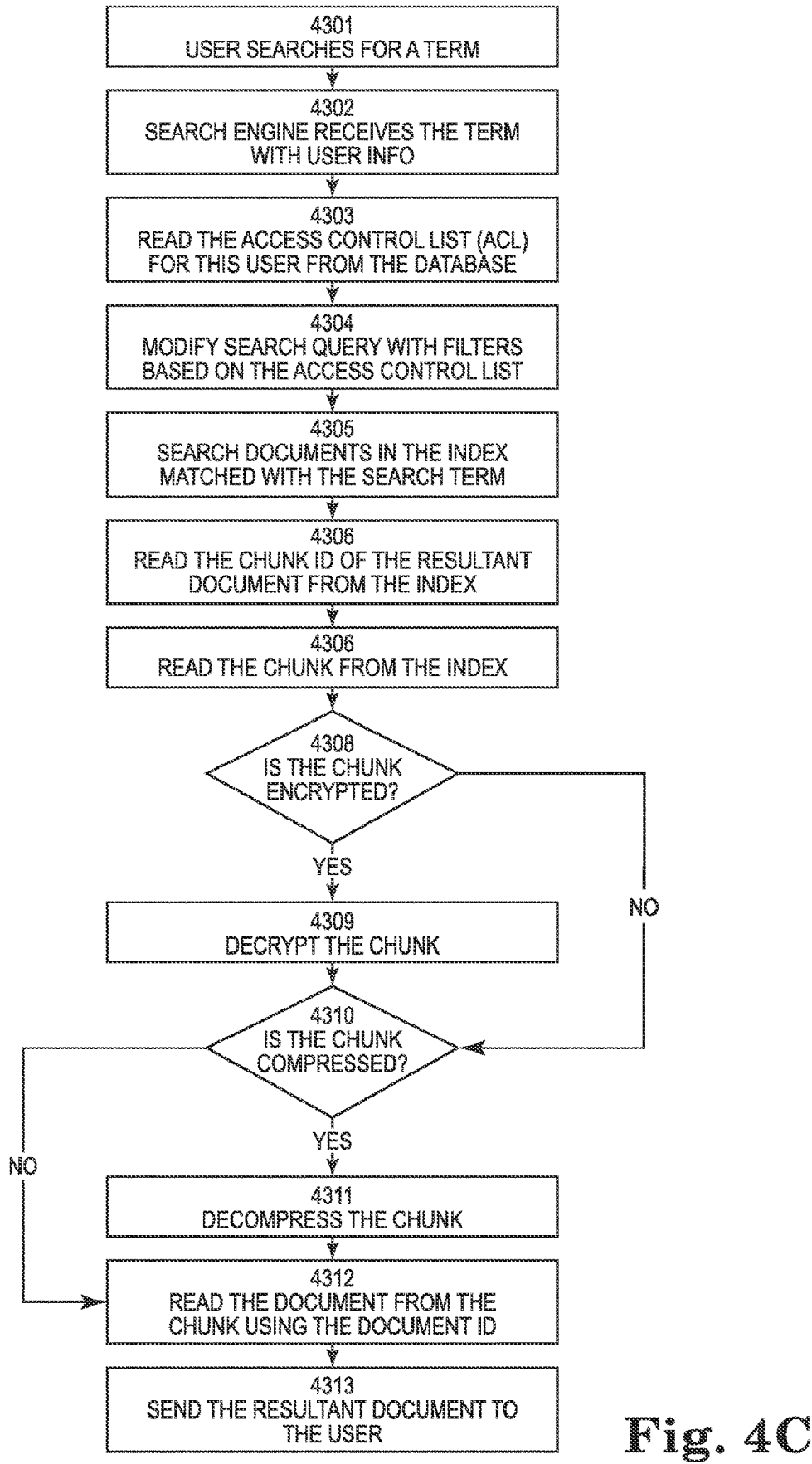
FIG. 4C shows a process for searching for information housed in the system in instances where a field level method of data encryption is utilized.

As the system in some embodiments may use different methods of encryption and/or compression to secure and store the information in the most efficient way possible, the process through which a user-initiated search query is processed may differ accordingly. FIGS. 4A-4C may show each of these processes for the particular encryption level.

For example, FIG. 4A depicts the process 4100 of a system user 101 performing a search, specifically where field level encryption has been utilized to secure the documents in the index 110. In some embodiments, the user may submit a search term 4101 through a web-based front end interface 102 such as REST, SOAP, RSS/ATOM, or API Call. The search engine then receives the search term in the query along with information describing the user that submitted the query 4102.

The authorization layer may then compare the user's information access control permissions 4103 with the access control list for the documents contained in the index, and then modify the query to filter out documents that the user is not authorized to access 4104. After the access control filters have been applied, the search engine may then match the search terms 4105 submitted by the user in the query to the contents of the inverted index 110.

When the resultant matching documents are read from the index 4106, the system may then determine if the documents contain individually encrypted fields 4108. If the matching documents contain individually encrypted fields, the encrypted fields may then be decrypted 4109. After decryption, the system may determine if the resultant matching documents contain individually compressed fields 4110. If the matching documents contain individually compressed fields, the compressed fields may then be decompressed 4111. Where the matching documents contain additional fields that are compressed and/or encrypted, several of the above steps (i.e., 4107, 4108, 4109, 4110, and/or 4111) may be repeated. Once all contents of the resultant matching documents have been decrypted and decompressed, the search results may then be presented back to the user 4112.

FIG. 4B depicts the process 4200 of a system user 101 performing a search, specifically where document level encryption has been utilized to secure the documents in the inverted index 110. In some embodiments, the user may submit a search term 4201 through a web-based front end interface 102 such as REST, SOAP, RSS/ATOM, or API Call. The search engine then receives the search term in the query along with information describing the user that submitted the query 4202.

The authorization layer may then compare the user's information access control permissions 4203 with the access control list for the documents contained in the index, and then modify the query to filter out documents that the user is not authorized to access 4204. After the access control filters have been applied, the search engine may then match the search terms 4205 submitted by the user in the query to the contents of the inverted index 110.

When the resultant matching documents are read from the index 4206, the system may then determine if the documents are encrypted 4207. If the matching documents are encrypted, the documents may then be decrypted 4208. After decryption, the system may determine if the resultant matching documents are compressed 4209. If the matching documents are compressed, the compressed documents may then be decompressed 4110. Once all contents of the resultant matching documents have been decrypted and decompressed, the search results may then be presented back to the user 4211.

FIG. 4C depicts the process 4300 of a system user 101 performing a search, specifically where chunk level encryption has been utilized to group individual documents together as chunks for the purposes of encryption and storage in the inverted index 110. In some embodiments, the user may submit a search term 4301 through a web-based front end interface 102 such as REST, SOAP, RSS/ATOM, or API Call. The search engine then receives the search term in the query along with information describing the user that submitted the query 4302.

The authorization layer may then compare the user's information access control permissions 4303 with the access control list for the documents contained in the index, and then modify the query to filter out documents that the user is not authorized to access 4304. After the access control filters have been applied, the search engine may then match the search terms 4305 submitted by the user in the query to the contents of the inverted index 110.

When the resultant matching documents are read from the index, the system may then also gather an identifier for the associated chunks which contain the matching documents 4306. With the chunk identifier as a reference, the system may then read in the full contents of the associated chunk containing the matching document or documents 4307.

The system may then determine if the chunks containing the matching documents are encrypted 4308. If the chunks containing the matching documents are encrypted, the chunks may then be decrypted 4309. After decryption, the system may determine if the associated chunks containing the matching documents are compressed 4310. If the chunks containing the matching documents are compressed, the compressed chunks may then be decompressed 4311. Once the chunks containing the resultant matching document or documents have been decrypted and decompressed, the system may then read the full contents of the resultant matching documents from the search 4312. Once this has occurred, the search results may then be presented back to the user 4313.

Figure 5:
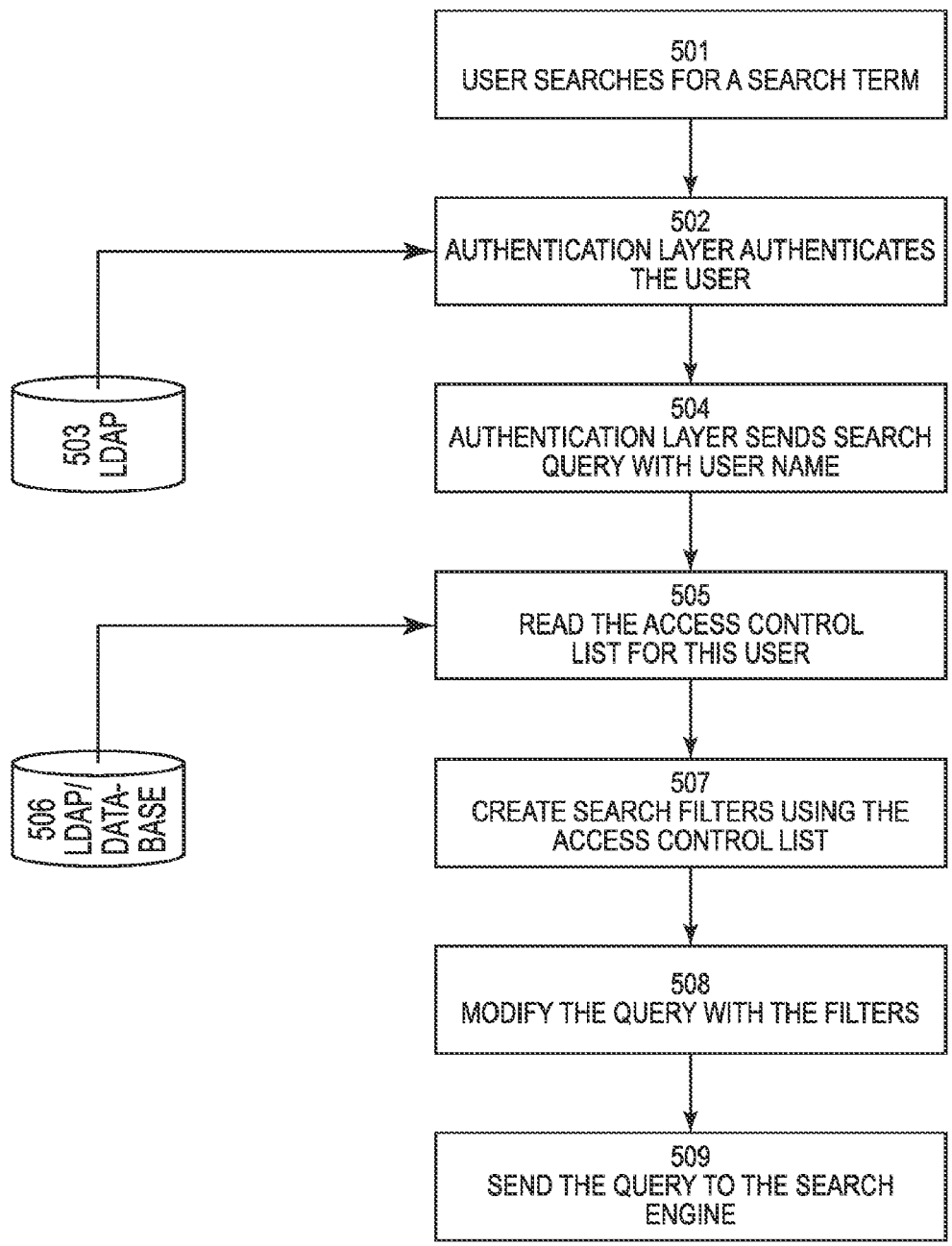
FIG. 5 shows a process for enforcing authentication and authorization controls within the system.

The methods of both authentication and authorization may significantly increase the level of security of the search system 100. FIG. 5 details the authentication and authorization processes that may be used in some embodiments to ensure that potentially sensitive information is not compromised by an unrecognized or unauthorized user. When a user submits a query or search term 501, an authentication layer 502 may first check the user's submitted credentials (username/password) against an LDAP directory 503 to ensure that the user is recognized by the system and is authenticated to begin or continue a session within the application.

Once authenticated, the authentication layer may then pass on the user's search query along with their username to the authorization layer for further scrutiny of the request. The authorization layer may then compare the user's information access control permissions 505 with the access control list for the documents contained in the index, and then modify the query 508 to filter out documents that the user is not authorized to access 507. After the access control filters have been applied, the search engine may then match the search terms submitted by the user in the query to the contents of the inverted index 110. The authorization and authentication processes are performed in real-time in such a way that as users are granted access to the system and access to the system is revoked, the user's ability or inability to view specific records is updated and functioning in real-time.

The user interface for the search screen in some embodiments may comprise a single web page. One reason that traditional searching can be slow and inefficient, in addition to the searching itself, is that many typical search pages require a user to make multiple mouse clicks. This may be the case because the search parameters may be too limited, requiring a user to drill into the data to find what they are looking for, but it may also occur because search parameters and search results may be presented on two or more separate pages, which requires a user to click back and forth between them. In some embodiments of the present disclosure, the search functionality may be housed on one screen, so that a user can perform or modify a search, and view the results all on the same page.

In some embodiments, the web-based user interface may provide a categorical display of search results, for example. Such a display of search results may generally directly correspond to the contents of the index. For example, the index may contain an array of data fields, or facets, that describe each record. Each record may then be logically arranged and put into categories based on its facets. As the front end categorical display of search results are directly mapped from the index, the user may see a summarized view of the occurrence of various facets from within the index on a single web page. This generally allows a user to quickly navigate to a specific sub-set of search results that may have a desired set of facets or characteristics. In some embodiments, a user may be provided a selection of possible actions for navigating to a specific sub-set of search results. Some examples of possible actions include: a user may opt to limit the search results to records that contain a specific facet, or group of facets; a user may opt to limit the search results to records that do not contain a specific facet, or group of facets; or a user may opt to limit the search results to records that contain a specific facet at the exclusion of all other facets, for example. Still other options are available in other embodiments.

In some embodiments of the present disclosure each search field that can be returned, may be separately searchable.

In some embodiments of the present disclosure, the system, method, and products may allow a user to save their most commonly performed searches so that they can avoid replicating the same sequence of key strokes over and over again.

The above system may be advantageous for several reasons. For example, it may facilitate highly performant (fast) and highly secured searching of structured or unstructured information. This may be accomplished through a the mentioned methods to encrypt and control access to the searchable information within an inverted index. The method may include a mechanism for restricting unauthorized access to the searchable information using authentication and document level authorization. This may include dynamic modification of search queries so that the user may only view search results that he/she is authorized to view. This may also include an encryption package for securing the searchable information at the storage layer of the inverted index. The configuration framework may allow the following components to be adjusted based on the specific functional or security requirements for each particular implementation. The configurable components include encryption granularity relating to field level, document level, or chunk level encryption. Other configurable components include encryption Algorithms, keys, and an encryption library for storing the same. In some embodiments, stronger algorithms can be used for the most sensitive information. Other configurable components include encryption with or without compression (to reduce disk space and improve performance).

The described system may be advantageous when compared with known inverted indexes because it incorporates a user authorization layer to prevent unauthorized access to the searchable information. Unlike other inverted indexes, the system may combine a highly configurable encryption package so that information can be secured commensurate with its level of sensitivity. For example, social security numbers could be encrypted with a stronger algorithm than phone numbers.

Additionally, an inverted index may contain a reference layer that pairs any possible search term (token), with a listing of all of the documents (posting list) containing that search term. When a search query is executed, the search terms are matched against the tokens, and then the associated documents referenced in the posting list for that token are retrieved from the storage layer (where the full contents of the documents are actually stored). One approach to achieve secured search involves encrypting the reference layer (the tokens and posting list).

The presently described system may be advantageous when compared to an inverted index with an encrypted reference layer. That is, in the present system, in addition to encrypting the inverted index at the reference layer through chunk level encryption, the system may also encrypts the information in the place where it is actually most vulnerable—the storage layer. While other approaches may encrypt just the reference layer (tokens and posting list), none actually encrypt the full documents in storage as well. Because of this, the system presents a security improvement over the existing method of only encrypting the reference layer of the index. Another way in which the system offers an improvement over this approach, is that it allows for encryption at a less granular level (chunk level). Encryption on a larger set of data (such as a fixed size chunk) may be more secured than encrypting small individual tokens. This is because encryption at a less granular level increases the entropy and obscurity of the information in its encrypted state.

Still further advantages of the present system relate to a performance improvement over the approach of encrypting the reference layer of an inverted index. Greater performance may be possible through the configurable compression properties of the system. This may increase the speed of search and allows for more scalability by reducing space taken up on the disk by the index. Compression also further enhances security by reducing redundancy of search terms (or tokens) found within the documents.

The system is further advantageous by incorporating a higher degree of flexibility and configurability. This allows each specific implementation to adjust components such as encryption granularity and compression accordingly to the level of security and/or performance desired. This enhanced flexibility allows users to achieve greater balance between security and performance.

While the system, method and computer products for secure, fast searching have been described in reference to some exemplary embodiments, these embodiments are not limiting and are not necessarily exclusive of each other, and it is contemplated that particular features of various embodiments may be omitted or combined for use with features of other embodiments while remaining within the scope of the invention.

What is claimed is:

1. A system for fast secured searching, the system comprising:
    a database stored on non-transitory computer readable media, the database storing an access control list associating at least one authorized user with data accessible by each user, and encrypted data wherein at least a portion of the data is encrypted on a field level, and wherein at least a portion of the data is encrypted on a document level, and wherein at least a portion of the data is encrypted on a chunk level, where a chunk includes multiple documents, and wherein the access control list filters out documents for which the user it not authorized;
    a searchable inverted keyword index stored on non-transitory computer readable media, the index storing index data comprising keywords associated with the data, wherein the index data is encrypted; and
    an encryption/decryption layer including at least one algorithm for encrypting data for storage on the database and for decrypting results of the search before returning the results to the user;
    wherein communication is enabled between the database and the index, such communication being controlled by two-way secure socket layer certificate authentication over a computer network; and
    a search engine for searching the index for one or more user-identified keywords;
    a document authorization layer for controlling data access by checking the access control list to determine a user's accessible data, and applying one or more filters to a search query submitted by a user based on the access control list; and
    a computer-based user interface communicably coupled to the search engine over the computer network.

2. The system of claim 1, further comprising an encryption/decryption layer configured for at least one of: field level, document level, and chunk level encryption of the data, the encryption/decryption layer comprising a plurality of selective encryption algorithms for encrypting the data.

3. The system of claim 1, further comprising a compression/decompression layer.

4. The system of claim 1, wherein the keyword index is updated when data is added to the database or when data in the database is edited.

5. A method for fast secured searching, the method comprising:
  receiving a search query from a user via a computer-based user interface, the search query comprising a keyword;
  authenticating the user by comparing information access control permissions of the user against an access control list for data in a database, wherein the data in the database includes at least a portion of the data encrypted on a field level, and wherein at least a portion of the data is encrypted at the document level, and wherein at least a portion of the data is encrypted at the chunk level, where a chunk includes multiple documents;
  modifying the search query to filter out documents that the user is not authorized to access;
  searching an encrypted inverted keyword index to identify one or more encrypted documents having the keyword, the inverted keyword index comprising keywords associated with encrypted documents stored in a database; and
  for each document identified:
    obtaining the document from the database;
    decrypting the document;
    determining whether the document is compressed, and if the document is compressed, decompressing the document; and
  providing the document to the user.

6. The method of claim 5, wherein determining whether the document is encrypted comprises determining whether the document is subject to at least one of: field level, document level, and chunk level encryption.

7. The method of claim 5, wherein determining whether the document is compressed comprises determining whether the document is subject to at least one of: field level, document level, and chunk level compression.

8. The method of claim 5, wherein obtaining the document from the data store comprises obtaining the document over a computer network with two-way secure socket layer certificate authentication.

9. The method of claim 5, wherein providing the document to the user comprises providing the document over a computer network with two-way secure socket layer certificate authentication.

10. A system for fast secured searching, the system comprising:
  a data layer including a database and an inverted index, wherein:
    the database stores encrypted data on non-transitory computer readable media; and
    the inverted index is encrypted and stores keywords associated with the encrypted data, the index being stored on non-transitory computer readable media;
  the data layer further including a search engine, and an encryption/decryption layer, wherein:
    the search engine is configured for searching the inverted index for one or more user-identified keywords; and
    the encryption/decryption layer includes at least one algorithm for encrypting data for storage on the database and for decrypting results of the search before returning the results to the user, and wherein at least a portion of the encrypted data is encrypted at the field level, and wherein at least a portion of the data is encrypted at the document level, and wherein at least a portion of the data is encrypted at the chunk level, where a chunk includes multiple documents; and
  a web layer including a web server and an application server, the web server being communicatively coupled to the application server, wherein the web server performs user authentication by comparing information access control permissions of the user with an access control list, and then modifies the query to filter out data that the user is not authorized to access, where the data includes documents.

11. The system of claim 10, wherein communication to and from the web layer from and to the index, database, and search engine is controlled by two-way secure socket layer certificate authentication over the computer network.

12. The system of claim 10, wherein the encryption/decryption layer is configured for at least one of: field level, document level, and chunk level encryption of the documents.

13. The system of claim 10, further comprising a compression/decompression layer.

14. The system of claim 10, wherein the encryption/decryption layer comprises a plurality of selective encryption algorithms for encrypting the data.

15. The system of claim 10, wherein the database further stores authorized user data.

16. The system of claim 10, wherein the keyword index is updated when data is added to the database or when data in the database is edited.

17. The system of claim 10, wherein the keyword index is updated periodically.

18. The system of claim 10, further comprising several stages of authorization such that a particular set of users may be identified, the users' identities may be continually verified at particular stages, and search results filtered to control a type of information available to each user.

* * * * *